United States Patent Office 3,349,025
Patented Oct. 24, 1967

3,349,025
HYDROCRACKING WITH A PRESULFIDED TUNGSTEN OXIDE COMPOSITE CATALYST FROM THE GROUP COMPRISING OF SILVER, ZINC OR THORIUM ON A SILICEOUS CARRIER
Alfred M. Henke, Springdale, Bruce K. Schmid, McCandless Township, Allegheny County, and James R. Strom, O'Hara Township, Allegheny County, Pa., assignors to Gulf Research & Development Company, Pittsburgh, Pa., a corporation of Delaware
No Drawing. Filed July 15, 1965, Ser. No. 472,300
12 Claims. (Cl. 208—111)

This invention relates to specially activated, zinc-, silver-, and thorium-promoted, tungsten-containing composite hydrocracking catalysts, to their preparation, and to the hydrocracking of distillate hydrocarbon oils of low-nitrogen content in the presence of such activated catalysts.

It has been proposed in recent years to hydrocrack petroleum oils of low-nitrogen content at relatively mild conditions, e.g., at hydrogen pressures up to about 2000 p.s.i.g. and at temperatures in the range of about 600° to 750° F., with a significant part of the on-stream cycle being carried out at temperatures below about 650° F. Under these relatively mild conditions, the selection of the catalysts has been found to be very important as regards the practicality of the process. Because of the relatively low severity of the conditions employed and because of the reduced nitrogen poisoning, the overall results obtained in these instances is much more a reflection of the activity of the catalyst than is the case when high nitrogen feeds are hydrocracked at more severe operating conditions. As a consequence, more active catalysts are required when hydrocracking low-nitrogen feeds at relatively mild conditions. A wide variety of catalysts has been proposed for this purpose, including virtually every known hydrogenating metal, their oxides, their sulfides, and various mixtures thereof, supported on active cracking bases, such as silica alumina, silica-magnesia, silica-zirconia, zeolitic cracking catalysts, and the like. While a number of these catalysts are effective as hydrocracking catalysts, even by commercial standards, there is a continuing demand for catalysts having improved activity at presently used mild hydrocracking conditions, and that are capable of producing products of improved quantity, e.g., octane number, aromatics content, etc.

The present invention relates to silver-, zinc- and thorium-promoted tungsten hydrocracking catalysts of improved quality that are capable of producing products of improved quality when used in the hydrocracking of low-nitrogen content hydrocarbon oils. It has been found that silver-, zinc- and thorium-promoted tungsten catalysts of greatly improved activity and selectivity, and which exhibit relatively low rates of deactivation for purposes of hydrocracking hydrocarbon oil feed stocks having low-nitrogen contents, can be obtained by the use of the special sulfiding techniques of this invention. Thus, it has been found that improved silver-, zinc- and thorium-promoted tungsten catalysts are obtained by contacting combinations of tungsten with zinc, silver, thorium, or mixtures thereof that have been in calcined, i.e., oxide form, composited with an active, acidic, siliceous cracking support, such as a silica-alumina cracking catalyst, with a sulfiding mixture comprising hydrogen gas containing a minor proportion of a sulfiding agent at a temperature in the range of about 300° to 900° F., particularly 400° to 800° F. Contact with the sulfiding mixture can be effectively carried out at atmospheric pressure, but we prefer to use an elevated pressure of at least about 100 p.s.i.g., particularly in the range of about 100 to 1000 p.s.i.g., and especially about 150 to 600 p.s.i.g., but higher pressures, e.g., up to 2000 p.s.i.g. or more can be used. Contact is carried out for a period effective to convert at least a substantial proportion of the promoter metal and the tungsten to a sulfided form. Hydrogen sulfide is an example of a preferred sulfiding agent, but other equivalent materials containing divalent sulfur can be used. The catalysts activated as described above are especially adapted for use in hydrocracking hydrocarbon oils having a low-nitrogen content below about 15 p.p.m. and preferably below about 1 p.p.m., particularly when such hydrocracking is carried out at temperatures in the range of about 600° to 750° F. and at hydrogen partial pressures in the range of about 750 to 2000 p.s.i.g., and at liquid hourly space velocities in the range of about 0.5 to 8, preferably about 1 to 5 liquid volumes of oil per volume of catalyst per hour. However, the invention is not limited to the use of such conditions. The present invention includes the above-described method of activating the composite hydrocracking catalysts, the activated catalysts obtained therefrom, as well as methods of hydrocracking hydrocarbon oils having a low-nitrogen content in the presence of such catalysts.

While we do not intend to be bound by any particular theoretical considerations, we believe that the activity of the sulfided, silver-, zinc- or thorium-promoted tungsten catalysts of this invention may result from the sulfiding of partly oxidized, i.e., partly reduced oxides of zinc-tungsten, silver-tungsten and thorium-tungsten catalysts, so as possibly to form a complex with the siliceous cracking support, whereby an especially favorable balance between hydrocracking activity and hydrogenation activity is obtained. Thus, when the hydrocracking activity of a catalyst is significantly greater than its activity for hydrogenation of unsaturated fragments produced by hydrocracking, excessive coke formation and rapid aging will result. On the other hand, when the hydrocracking activity of a catalyst is relatively low in comparison with its hydrogenation activity, little hydrocracking, i.e., conversion to lower boiling components, will occur. Available evidence strongly suggests the presence of a sulfided, partial oxide of the zinc and tungsten, silver and tungsten, and thorium and tungsten compositions, having a good balance of hydrocracking and hydrogenation activities. An excellent balance of hydrocracking and hydrogenation activity is indicated by the low rate of deactivation obtained for the catalysts of this invention, and by the relatively high degree of conversion to lower boiling materials. The presence of a sulfided form of the silver-tungsten, zinc-tungsten and thorium-tungsten combinations is indicated not only by the sulfur content of the finished catalysts, but also by the fact that zinc oxide, silver oxide and tungsten trioxide are known to have little activity for either hydrogenation or hydrocracking of low-nitrogen content hydrocarbon oil distillates at mild conditions. On the other hand, the importance of a partly oxidized form of the catalyst during presulfiding is indicated by the fact that prereduced and sulfided catalysts of the kind indicated herein are relatively less effective than catalysts prepared in the manner disclosed herein. Thus, a catalyst containing 6 percent zinc and 19 percent tungsten on silica alumina was found to produce only 44 percent conversion of a pretreated furnace oil during hydrocracking, when the catalysts was sulfided in accordance with the present invention following a prereduction with hydrogen at 800° F. and 500 p.s.i.g. In contrast, the same catalyst was found to produce 65 percent conversion with the same feed stock and under the same conditions, when the catalyst was sulfided in the same way except for omission of the prereduction. The importance of a partly oxidized form of the catalyst is also indicated by the fact that tungsten trioxide, the fully oxidized form of tungsten, is known to be highly resistant to direct sulfiding.

As indicated above, the starting material used in the improved activating process of this invention comprises a combination of hydrogenating components consisting of a combination of hydrogenating components consisting of tungsten and silver, zinc or thorium, or tungsten and mixtures of two or more of the last three materials, composited with an active, acidic, siliceous cracking carrier. Tungsten-silver and tungsten-zinc combinations are preferred as catalysts containing the same exhibit superior aging characteristics. Although the carrier is an essential component of the present invention, any active, acidic, cracking support can be used. For example, there can be used with good results synthetic or semi-synthetic silica-alumina cracking catalysts. A specific example of a suitable support is a silica-alumina cracking catalyst containing 75 percent silica. Other suitable cracking supports are the silica-aluminas characterized by a preponderance of pore volume in pores of less than 50 Angstroms, an alkali metal content less than 0.01 percent and having a surface acidity at 600° F. greater than 0.25 meq. of ammonia per gram, prepared as described in copending application Ser. No. 374,810 filed in the name of M. M. Stewart on June 12, 1964, by mixing a freshly prepared silica sol free of cationic impurities and containing less than the equivalent of 5 percent silica, with an aqueous solution of alumina cations, and gelling. However, other active, acidic, siliceous cracking carriers can be used. For example, there can be used Super Filtrol cracking catalysts, acid-activated clays of the bentonite or montmorillonite type, or synthetically prepared plural gels of silica or alumina, silica and magnesia, silica-alumina and magnesia, silica-zirconia, silica-titania, silica-alumina-zirconia, and the like. Synthetic, crystalline, zeolitic cracking catalysts having substantially uniform pore sizes can also be used. The siliceous component of the support can form about 5 to 90 percent of the total composition of the support, with the balance of the support composition being made up of the additional component or components of the types indicated above. Generally speaking, the support should have a cracking activity index of above 30 percent and preferably above 45 percent. The expression "cracking activity index" is used in its conventional sense to indicate the volume percent conversion obtained under standard test conditions. The standard test conditions referred to herein are those of the Kellogg Cracking Activity Test, which conditions are described in U.S. Patent No. 3,078,221. The cracking supports whose use is included by the present invention are desirably promoted in their cracking activity by the presence of a halogen such as fluorine or chlorine to a level of about 1 percent to 8 percent.

The combination of hydrogenating components can be composited with the cracking support in any suitable manner. For example, the cracking support can be impregnated in a single step with a mixture of water-soluble zinc and tungsten, silver and tungsten, or thorium and tungsten salts such as zinc nitrate, silver nitrate, thorium nitrate and tungsten nitrate or ammonium metatungstate, or in successive steps with a zinc, silver or thorium salt and then a tungsten salt, or vice versa, following which the impregnated catalyst can be dried and calcined in air or other oxygen-containing gas to convert the hydrogenating metal components to the oxide form. Alternatively, the combination of hydrogenating components can be coprecipitated with the synthetically prepared siliceous cracking support and calcined in air or other oxygen-containing gas to form the oxides of the hydrogenating component metals. As previously noted, it is important that the combination of hydrogenating component metals be present in an oxided form prior to sulfiding in accordance with the present invention, since sulfided catalysts prepared from the same combinations of hydrogenating components in other forms, for example, prereduced form, do not produce equivalent results. The combined hydrogenating components can be present in the composite catalyst in any amount sufficient to impart hydrogenating activity thereto. In general, amounts in the range of about 5 to 40 percent, calculated as metals, by weight of the support are satisfactory, with amounts of about 10 to 30 percent being preferred. The atomic ratio of the promoter metal with respect to the tungsten can be in the range of about 0.1 to 5:1, but we prefer that it be in the ratio of about 0.3 to 4:1. Thus, when the promoter metal is zinc, good results can be obtained with about 2 to 10 percent zinc and about 3 to 30 percent tungsten, but especially active catalysts are obtained when the zinc is present in the amount of about 3.8 to 7.8 percent and the tungsten is present in the amount of about 6.2 to 22.2 percent.

The effect of the promoter metal content on the activity of the catalysts disclosed herein has been demonstrated by hydrocracking a pretreated fluid catalytically cracked furnace oil containing less than 1 p.p.m. nitrogen at 600° F., a pressure of 1000 p.s.i.g., at a liquid hourly space velocity of 2, in the presence of 10,000 s.c.f. of hydrogen/bbl. of feed stock, with several catalysts containing varying quantities of promoter metal. In each case the calcined catalyst was presulfided for two hours at 800° F. and 500 p.s.i.g., with a mixture of 85 percent hydrogen and 15 percent hydrogen sulfide. The results obtained were as follows:

| Hydrogenating Metals, Percent | | Conversion, Percent by Vol. Materials Boiling Below 400° F. |
|---|---|---|
| Zinc | Tungsten | |
| 3 | 19 | 37 |
| 6 | 19 | 65 |
| 9 | 19 | 38 |

As will be seen from the foregoing results, optimum results were obtained when the zinc content of the catalyst was six percent. The atomic ratio of the zinc with respect to tungsten in this optimum instance was 0.9:1, i.e., about 1:1. It will be understood that the relatively lower conversions obtained with higher and lower proportions of promoter metal does not signify unacceptability, since a higher degree of conversion can be obtained for these catalysts by simply raising the hydrocracking temperature, reducing the space velocity or both.

In accordance with the present invention, the calcined, promoted, composite catalysts are sulfided using a mixture containing chiefly hydrogen or a hydrogen-rich gas in admixture with a minor proportion of a sulfiding agent. The hydrogen component of the sulfiding gas need not be pure and can contain up to 30 percent or more of other gases, for example, methane or other hydrocarbon gases, of the kind and in the proportion usually occurring in the hydrogen that is available in refineries, e.g., reformer hydrogen. The use of a minor proportion of the sulfiding agent in the sulfiding gas is important for purposes of this invention, catalysts having markedly superior activities being obtained therewith. The preferred sulfiding agent is hydrogen sulfide. However, other sulfiding agents containing sulfur in the divalent form, for example, thiophenols, mercaptans, alkyl sulfides, and even sulfur-containing hydrocarbon oils, for example, oils having a sulfur content in excess of about 0.2 percent, can be used. In fact, elemental sulfur can be used as the sulfiding agent, although in this instance, it may be desirable also to utilize a flushing agent to remove excess, uncombined elemental sulfur prior to use of the catalysts in a hydrocracking reaction, so as to avoid undue contamination of products. Within the limits indicated, the proportion of the sulfiding agent in the hydrogen gas can vary depending upon the nature of the sulfiding agent. When the sulfiding agent is hydrogen sulfide, we prefer that the concentration of the hydrogen sulfide be in the range of about 1 to 30 percent by volume of the sulfiding gas mixture, and particularly good results are obtained when the hydrogen sulfide concentration is in the range of about 10 to 15 percent. Other sulfiding agents can be employed in proportions equivalent to, i.e., capable of yielding the above-indicated proportions of hydrogen sulfide.

The effect of the proportion of sulfiding agent in the sulfiding gas mixture has been demonstrated by hydrocracking a pretreated fluid catalytically cracked furnace oil fraction (less than 1 p.p.m. nitrogen) at 600° F., a pressure of 1000 p.s.i.g., a liquid hourly space velocity of 2.0, in the presence of 1000 s.c.f. hydrogen per barrel of oil feed, using catalysts that had been sulfided while in calcined form with a sulfiding gas mixture containing varying proportions of hydrogen and sulfiding agent. The catalysts contained six percent zinc and 19 percent tungsten on a silica alumina cracking base. The results obtained were as follows:

SULFIDING CONDITIONS

| Temp., °F. | Pressure, p.s.i.g. | Time, hrs. | Percent $H_2S$ | Conversion, Percent Material Boiling Below 400° F. |
|---|---|---|---|---|
| 800 | 175 | 2 | 15 | 73 |
| 800 | 175 | 2 | 95 | 30 |

From the foregoing results, it will be seen that the use of a minor proportion of sulfiding agent in the sulfiding gas mixture is important for purposes of this invention.

The sulfiding of the composite catalysts should be carried out at temperatures in the range of about 300° to 900° F., with especially active catalysts being obtained in the range of about 400° to 800° F. Sulfiding temperatures in excess of about 900° F. may be accompanied by a decrease in activity. The sulfiding of the composite catalysts can be carried out at atmospheric pressure, but more active catalysts are obtained by sulfiding at elevated pressure, i.e., above about 100 p.s.i.g. Good results are obtainable by pressures in the range of about 150 to 1000 p.s.i.g., with outstanding results being obtained at pressures of about 250 to 650 p.s.i.g., but still higher pressures can be used. Similarly, excellent results have been obtained by the use of space velocities in the range of about 1000 to 3000 volumes of sulfiding gas per volume of catalyst per hour, but higher and lower space velocities can be used. For example, the sulfiding gas mixture can be utilized at the rate of 100 to 10,000 volumes of gas per volume of catalyst per hour.

The effect of varying the temperature and pressure of sulfiding has been demonstrated by hydrocracking a pretreated fluid catalytically cracked furnace oil fraction (less than 1 p.p.m. nitrogen) under the conditions previously described, using catalysts that had been sulfided with a mixture of hydrogen and hydrogen sulfide at various temperatures and pressures. Each of the catalysts comprised 6 percent promoter metal and 19 percent tungsten on a silica alumina cracking base. The sulfiding conditions and the results obtained were as follows:

SULFIDING CONDITIONS

| Hydrogenating Components | Temp., °F. | Pressure, p.s.i.g. | $H_2S$, percent | Time, hrs. | Conversion, Percent Material Boiling Below 400° F. |
|---|---|---|---|---|---|
| Zn-W | 600 | 0 | 8 | 1 | 24 |
| Zn-W | 800 | 0 | 15 | 2 | 51 |
| Zn-W | 800 | 175 | 15 | 2 | 73 |
| Zn-W | 600 | 250 | 15 | 2 | 48 |
| Zn-W | 800 | 500 | 15 | 2 | 80 |
| Ag-W | 600 | 0 | 8 | 1 | 36 |
| Ag-W | 600 | 250 | 15 | 2 | 72 |
| Ag-W | 800 | 500 | 15 | 2 | 65 |

From a comparison of the first and second runs, the beneficial effect of higher temperatures is shown, the variations in hydrogen sulfide content and time having been previously found to be insignificant. Comparison of the second and third runs, the third and fifth runs and the first and fourth runs shows the beneficial effect of increasing the sulfiding pressure. Comparison of the second and fourth runs shows that pressure and temperature are to some extent interchangeable. Comparison of the last three runs shows the similar effect of varying the temperature and pressure of sulfiding for a silver-tungsten catalyst.

The composite catalysts referred to above can be activated with the sulfiding gas referred to above for any period of time sufficient to convert a substantial portion of the tungsten oxide to the active, oxygen-containing sulfided form. The optimum period of contact of the composite catalyst with the sulfiding gas mixture will depend to some extent upon the sulfiding conditions and upon the nature of the sulfiding agent, as well as the space velocity, with relatively longer sulfiding periods being required for less severe conditions and less active sulfiding agents. By way of illustration, when hydrogen sulfide is used as the sulfiding agent in the proportion of about 10 to 15 percent of the sulfiding gas mixture, good results are obtainable in as little as about 15 minutes or less than to ½ hour at sulfiding temperatures of about 600° to 800° F., but we prefer to carry out sulfiding for at least one hour. When lower temperatures and smaller proportions of sulfiding agent are used, longer periods may be required. Normally it will not be necessary to carry out sulfiding for more than about 24 hours, as no further improvement in catalyst activity will be obtained by the use of further sulfiding periods. By way of illustration, sulfiding of a 6 percent zinc and 19 percent tungsten on silica-alumina catalyst with 85 percent hydrogen and 15 percent hydrogen sulfide at 800° F. and 500 p.s.i.g., for periods of 15 minutes to 8 hours resulted in a sulfur content in the finished catalysts of about 5.36 to 6.75 percent (approximately 67 percent of theoretical for $ZnS$ and $WS_2$), with substantially comparable activities being observed for the various catalysts.

As indicated previously, the activated, composite catalysts of this invention are especially useful in the hydrocracking of hydrocarbon oil distillates containing not more than about 15 p.p.m. of nitrogen, preferably less than 1 p.p.m. of nitrogen, and boiling above 400° F., to produce products at least 40 percent of which boil below the initial boiling point of the feed stock. Examples of suitable charge stocks are furnace oils, virgin gas oils and catalytically cracked fuel stocks that have been pretreated by hydrofining to reduce the nitrogen content to not more than 15 p.p.m., in conventional manner, for example, with cobalt-molybdenum, nickel-cobalt-molybdenum, or nickel-tungsten catalyst on an alumina or silica-alumina support at temperatures of 500° to 800° F., hydrogen partial pressures of 500 to 2500 p.s.i.g., liquid hourly space velocities of 0.2 to 10, and using about 4000 to 20,000 s.c.f. of hydrogen/bbl. of oil. Especially advantageous results are obtained when the hydrocracking of these low-nitrogen content oils is effected at relatively mild conditions, for example, in the range of about 550° to 750° F., with a significant part of the on-stream cycle being spent at temperatures below about 650° F., at hydrogen partial pressures in the range of about 750 to 2000 p.s.i.g., and at liquid hourly space velocities in the range of about 0.5 to 8, preferably in the range of about 1 to 5 liquid volumes of oil per volume of catalyst per hour.

The nature of the promoter metal in the tungsten-containing catalysts is important for purposes of the present invention, as the herein disclosed activating procedure does not have an equivalent effect on every combination of tungsten and promoter metal. Thus, when a catalyst comprising 6 percent nickel and 19 percent tungsten on a silica alumina cracking carrier that had been sulfided in accordance with the present invention was compared for hydrocracking activity with a zinc-tungsten catalyst of corresponding composition that was sulfided under the same conditions, the former catalyst was found to be much less active. This was surprising in view of the fact that the reverse was true for the reduced unsulfided catalysts. This is shown in the following table:

PRETREATMENTS

| Hydrogenating Components | 100% H₂, 600° F., 0 p.s.i.g., 1 Hr., Conversion, percent | 85% H₂, 15% H₂S, 800° F., 500 p.s.i.g., 2 Hrs., Conversion, Percent |
|---|---|---|
| Ni-W | 80 | 36 |
| Zn-W | 10 | 80 |

From the foregoing data it will be seen that the herein described activation treatment not only does not affect all combinations of promoter metal and tungsten in an equivalent manner, but actually may reduce the activity of some combinations of promoter metal and tungsten.

The unique coaction of the herein disclosed presulfiding treatment with the disclosed combinations of tungsten and promoter metals is further shown by a comparison of a number of tungsten-containing catalysts for hydrocracking activity on a pretreated furnace oil fraction following pretreatment in accordance with the present invention. The hydrocracking runs in these instances were carried out at the conditions described for other demonstration runs described herein. The hydrogenating components for each catalyst were as shown in the table. The catalyst base in each instance was a silica-alumina cracking catalyst. Presulfiding of the catalysts was effected for 2 hours at 800° F. and 500 p.s.i.g. with a mixture of 85 percent hydrogen and 15 percent hydrogen sulfide. Representative results were as follows:

Hydrogenating components:     Conversion, percent
19% tungsten–6% thorium ---------------- 72
19% tungsten–6% silver ----------------- 71
19% tungsten–6% zinc ------------------- 55
19% tungsten–6% cadmium ---------------- 39
19% tungsten–6% manganese -------------- 35
19% tungsten–6% copper ----------------- 25
19% tungsten–6% chromium --------------- 21
19% tungsten --------------------------- 21

From the foregoing comparison it will be seen that the herein disclosed pretreatment exerts a unique effect on the composite catalysts of this invention.

*Example*

In a specific embodiment of the invention a commercial silica-alumina cracking catalyst containing 75 percent silica and 25 percent alumina and having a typical Kellogg cracking activity of about 74 was impregnated in four stages by the incipient wetness technique, with intermediate drying at 250° F. for about 24 hours. The first and third impregnations were carried out using an aqueous solution of ammonium meta-tungstate and ammonium fluoride. The second and fourth impregnations were carried out with an aqueous solution of silver nitrate. The dried catalyst was calcined by heating to 1000° F. over a period of 6 hours and maintaining the temperature at this level for 10 hours. The calcined catalyst contained 6 percent silver, 19 percent tungsten and 2 percent fluorine. The calcined catalyst was charged to a bench scale hydrocracking unit. The catalyst was sulfided in situ by treatment with a mixture of 85 percent hydrogen and 15 percent hydrogen sulfide for a period of 2 hours at 600° F. and 250 p.s.i.g. The catalyst was then cooled, flushed with hydrogen and pressured to 1000 p.s.i.g. and treating was recommenced. A pretreated (hydrofined) fluid catalytically cracked furnace oil (less than 1 p.p.m. nitrogen) feed stock was cut into the reactor at about 400–450° F. The reaction temperature was gradually raised to a temperature sufficient to provide 70 percent conversion (once-through) to materials boiling below 400° F., in this instance 550° F. at the inlet. Thereafter, the temperature was gradually raised at a rate sufficient to provide a constant, 70 percent conversion and this conversion level was maintained for 21 days, at which time the reaction temperature was about 645° F. The leaded Research Octane Number (3 cc. TEL/gal.) of the naphtha product obtained after 240 to 288 hours, when the reactor temperature was 610° F., was found to be 91.2, and the leaded Motor Octane Number was found to be 86.3. In contrast, the corresponding leaded Research Octane Number was 88.4 and the corresponding leaded Motor Octane Number was 81.7, for the product obtained with the same feed stock, at the same percent conversion, at equivalent temperature and time, using a catalyst composition of 6 percent nickel, 19 percent tungsten and 2 percent fluorine on the same carrier.

It will be understood that the foregoing specific embodiments are illustrative only and are not intended to be limiting. Accordingly, similarly advantageous results can be obtained by the use of other proportions of tungsten, other sulfiding conditions within the range disclosed herein, by the use of other hydrocracking conditions, and other feed stocks disclosed herein. Although the presulfiding method disclosed herein is especially useful in connection with the tungsten catalysts disclosed herein, it can also be used for sulfiding other composite hydrocracking catalysts containing other hydrogenating metals.

We claim:
1. A presulfided, composite hydrocracking catalyst prepared by contacting a composite of oxides of tungsten and at least one metal selected from the group consisting of silver, zinc and thorium, and an active, siliceous cracking catalyst, with a sulfiding gas mixture containing chiefly hydrogen, in admixture with a minor proportion of a sulfiding agent, at a temperature in the range of about 300° to 900° F., for a period sufficient to sulfide at least a substantial portion of said oxides, said sulfiding being effected prior to contact of the catalyst with a hydrocarbon oil feed stock to be converted.

2. The catalyst of claim 1 where the active, siliceous cracking catalyst is a silica-alumina cracking catalyst having an activity index of at least about 35, and containing about 5 to 90 percent silica.

3. The catalyst of claim 1 where the material that is subjected to sulfiding is a composite of oxides of tungsten and silver, and said active, siliceous cracking catalyst.

4. The catalyst of claim 1 where the material that is subjected to sulfiding is a composite of oxides of tungsten and zinc, and said active, siliceous cracking catalyst.

5. The catalyst of claim 1 where the total metals content is about 5 to 40 percent and the atomic ratio of said metal to tungsten is about 0.1 to 5:1.

6. The catalyst of claim 1 where the total metals content is about 10 to 30 percent and the atomic ratio of said metal to tungsten is about 0.3 to 4:1.

7. A method of presulfiding a hydrocracking catalyst containing oxides of tungsten and at least one metal selected from the group consisting of silver, zinc and thorium, composited with an active, siliceous cracking catalyst, with a sulfiding gas mixture containing chiefly hydrogen, in admixture with a minor proportion of a sulfiding agent, at a temperature in the range of about 300° to 900° F., for a period sufficient to sulfide at least a substantial portion of said oxides, said presulfiding being effected prior to contact of the catalyst with a hydrocarbon oil feed stock to be converted.

8. A method of presulfiding a hydrocracking catalyst containing oxides of tungsten and at least one metal from the group consisting of silver, zinc and thorium, composited with an active, siliceous cracking catalyst, with a sulfiding gas mixture containing chiefly hydrogen, in admixture with a minor proportion of a sulfiding agent at a temperature in the range of about 400° to 800° F., and at a pressure of about 100 to 2000 p.s.i.g. for a period sufficient to sulfide at least a substantial portion of said oxides, said presulfiding being effective prior to contact of the catalyst with a hydrocarbon oil feed stock to be converted.

9. A method of presulfiding a tungsten hydrocracking catalyst containing oxides of tungsten and at least one metal from the group consisting of silver, zinc and thorium, composited with an active, siliceous cracking catalyst, with a sulfiding gas mixture containing chiefly hydrogen, in admixture with a minor proportion of a sulfiding agent containing divalent sulfur in an amount equivalent to 1 to 30 percent hydrogen sulfide by volume of the sulfiding gas mixture, at a temperature in the range of about 400° to 800° F., at a pressure in the range of about 250 to 650 p.s.i.g., at a space velocity in the range of about 100 to 100,000 standard cubic feet of sulfiding gas per cubic foot of catalyst per hour, for a period sufficient to sulfide at least a substantial portion of said oxides, said period being in the range of about 15 minutes to 24 hours, said presulfiding being effected prior to contact of the catalyst with a hydrocarbon oil feed stock to be converted.

10. A hydrocracking method comprising contacting a low-nitrogen distillate hydrocarbon oil feed stock with hydrogen at hydrocracking conditions and with a presulfided hydrocracking catalyst prepared by contacting a composite of oxides of tungsten and at least one metal selected from the group consisting of silver, zinc and thorium, and an active, siliceous cracking catalyst, with a sulfiding gas mixture containing chiefly hydrogen in admixture with a minor proportion of a sulfiding agent, at a temperature in the range of about 300° to 900° F., for a period sufficient to sulfide at least a substantial portion of said oxides, said contact of feed stock and catalyst being carried out to form products of lower boiling range than the feed stock.

11. A hydrocracking method comprising contacting a low-nitrogen distillate hydrocarbon oil feed stock containing not more than about 15 p.p.m. nitrogen with hydrogen at a temperature in the range of about 600° to 750° F., at a hydrogen partial pressure in the range of about 750 to 2000 p.s.i.g., and at a space velocity in the range of about 0.5 to 8 liquid volumes of feed per volume of catalyst per hour, and with a presulfided hydrocracking catalyst prepared by contacting a composite of oxides of tungsten and at least one metal selected from the group consisting of silver, zinc and thorium, and an active, siliceous cracking catalyst, with a sulfiding gas mixture containing chiefly hydrogen in admixture with a minor proportion of a sulfiding agent, at a temperature in the range of about 300° to 900° F. and at a pressure of about atmospheric to 2000 p.s.i.g. for a period sufficient to sulfide at least a substantial portion of said oxides, said contacting of feed stock and catalyst being carried out to form products of lower boiling range than the feed stock.

12. A presulfided, composite hydrocracking catalyst prepared by contacting a composite of oxides of tungsten and thorium, and an active siliceous cracking catalyst with a sulfiding gas mixture containing chiefly hydrogen, in admixture with a minor proportion of a sulfiding agent, at a temperature in the range of about 300° to 900° F., for a period sufficient to sulfide at least a substantial portion of said oxides.

References Cited

UNITED STATES PATENTS

| | | | |
|---|---|---|---|
| 2,356,576 | 8/1944 | Free et al. | 208—111 |
| 3,200,063 | 8/1965 | Wilson | 208—111 |
| 3,213,012 | 8/1965 | Kline et al. | 208—110 |
| 3,294,674 | 12/1966 | Beuther et al. | 208—111 |

DELBERT E. GANTZ, *Primary Examiner.*

ABRAHAM RIMENS, *Examiner.*